United States Patent
Won

(10) Patent No.: US 7,333,828 B2
(45) Date of Patent: Feb. 19, 2008

(54) METHOD FOR COMPENSATING OUTPUT POWER OF MOBILE TERMINAL

(75) Inventor: Jun Hyuk Won, Kyoungki-do (KR)

(73) Assignee: Curitel Communications, Inc. (KR)

( * ) Notice: Subject to any disclaimer, the term of this patent is extended or adjusted under 35 U.S.C. 154(b) by 587 days.

(21) Appl. No.: 10/744,321

(22) Filed: Dec. 22, 2003

(65) Prior Publication Data

US 2004/0137934 A1    Jul. 15, 2004

(30) Foreign Application Priority Data

Dec. 31, 2002    (KR) ...................... 10-2002-0088098

(51) Int. Cl.
*H04B 7/00*    (2006.01)
(52) U.S. Cl. ........................ 455/522; 455/69
(58) Field of Classification Search ................ 455/522, 455/69, 24, 504, 23, 42, 63, 703, 71, 63.1
See application file for complete search history.

(56) References Cited

U.S. PATENT DOCUMENTS 6,115,587 A * 9/2000 Kim ........................... 455/126

FOREIGN PATENT DOCUMENTS

| JP | 8-37473 | 2/1996 |
|---|---|---|
| JP | 9-275373 | 10/1997 |
| JP | 11-308157 | 11/1999 |
| JP | 2001-16145 | 1/2001 |
| JP | 2001-244841 | 9/2001 |
| KR | 1997-55781 | * 7/1997 |
| KR | 1998-67174 | 10/1998 |
| KR | 1999-80212 | 11/1999 |
| KR | 2001-65802 | 7/2001 |

* cited by examiner

*Primary Examiner*—Matthew Anderson
*Assistant Examiner*—Angelica M. Perez
(74) *Attorney, Agent, or Firm*—Blakely, Sokoloff, Taylor & Zafman

(57) ABSTRACT

Provided is a paging system where a paging transmitter that outputs frequencies of wide bandwidth by using a table for storing power values corresponding to the detected voltages of the output signals. The method for displaying frequency-based output of the paging transmitter includes the steps of: a) detecting the voltages of output signals when the RF signals are outputted and analyzing the frequencies; b) if the current frequency is the center frequency, searching and displaying corresponding data in the table; c) of the current frequency is lower than the center frequency, searching corresponding data in the table and displaying the data after subtracting a predetermined offset value; and d) if the current frequency is higher than the center frequency, searching corresponding data in the table and displaying the data after adding the predetermined offset value thereto.

7 Claims, 7 Drawing Sheets

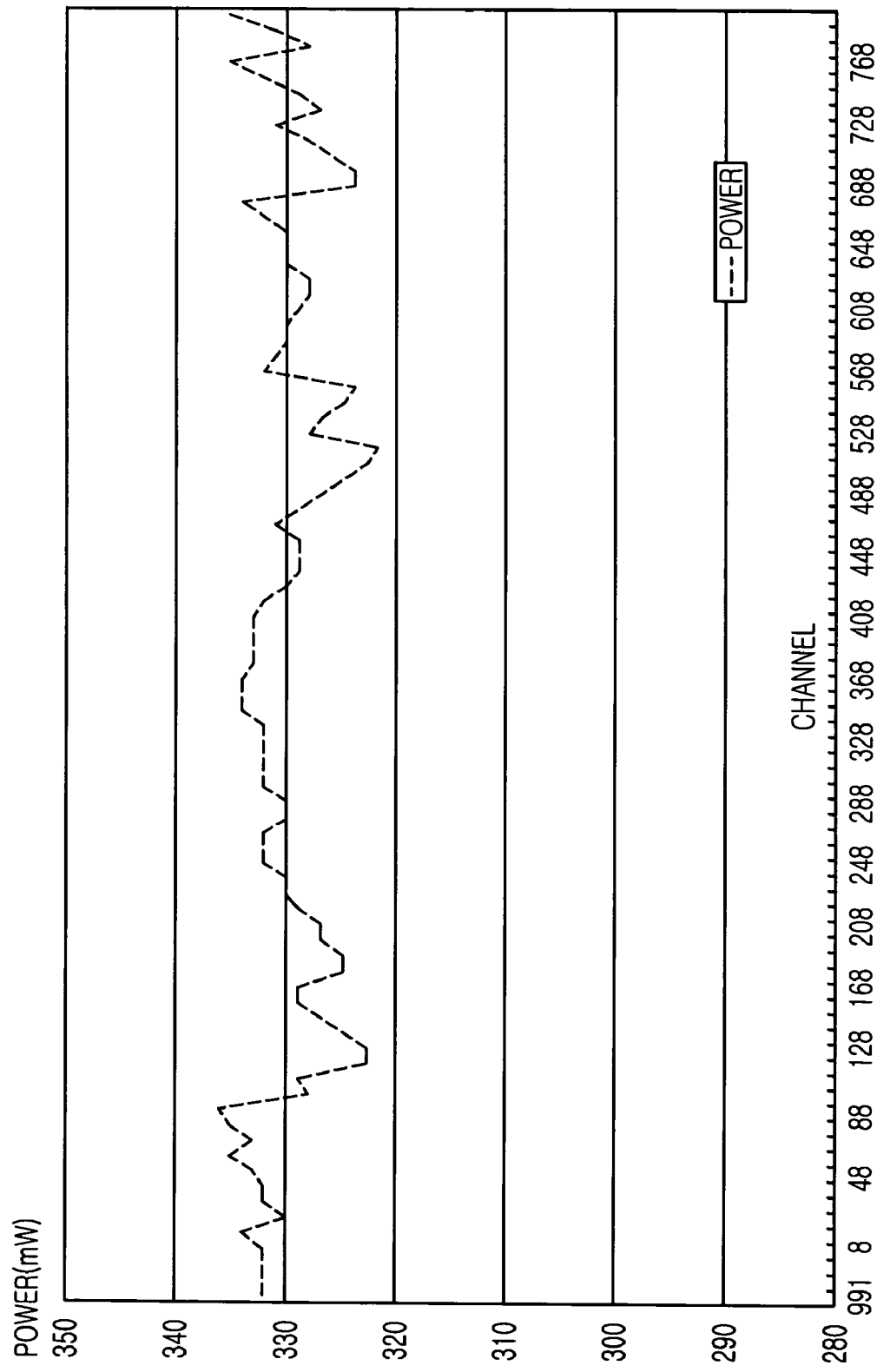

METHOD FOR COMPENSATING OUTPUT POWER OF MOBILE TERMINAL

FIELD OF THE INVENTION

The present invention relates to a method for compensating an output power of a mobile terminal; and, more particularly, to a method for effectively compensating the output power of the mobile terminal according to frequencies used in the mobile terminal.

DESCRIPTION OF RELATED ART

Generally, an output power of a mobile terminal needs to be preset for communication between the mobile terminal and a base station. The output power should be maintained below 24.7 dB although frequencies are different according to regions. Accordingly, the output power of mobile terminal is usually preset to be below about 24 dB to respective frequencies.

FIG. 1 is a flowchart for explaining a conventional method for compensating an output power of mobile terminal.

Referring to FIG. 1, several frequencies are selected as delegation frequencies among currently used frequencies at step 101. After selecting the delegation frequencies, the compensating program is performed for the selected delegation frequencies to obtain compensated delegation frequencies at step 102. The compensated delegation frequencies are grouped with currently used frequencies which are not compensated. A compensation value for the delegation frequency is applied to the other frequencies of the same group at step 103.

The frequency group herein is a set of a plurality of frequencies that can share one compensation value to control the output power of the mobile terminal. The number of frequency groups depends on output power deviation characteristics.

In order to obtain the compensation value, a delegation frequency is chosen in the frequency group and stored in a read only memory (ROM) of the mobile terminal. In order to enhance the output power control of the mobile terminal, the number of frequency groups and the delegation frequencies should be increased.

As the number of the delegation frequencies is increased, the size of ROM used in the mobile terminal is enlarged. It results in increase of production costs, and it requires long time to compensate output power for a large number of delegation frequencies.

In a case of a PCS mobile phone, there are 23 frequencies in the PCS mobile phone. Among the 23 frequencies, 21 frequencies are practically used. It requires a large number of equipments to compensate all 21 frequencies to each mobile terminal. Accordingly, a small number of frequencies are selected as a delegation frequency at first, and the output power compensation method is performed on the delegation frequencies to get the compensation value. The compensation value for the delegation frequency is applied to the other frequencies in the same group. The number of delegation frequencies depends on characteristics of the mobile terminal. Usually, 7 to 9 frequencies are selected for compensating frequencies. For example, among $1^{st}$ frequency to $23^{rd}$ frequency, $2^{nd}$, $5^{th}$, $8^{th}$, $11^{th}$, $14^{th}$, $17^{th}$ and $21^{st}$ frequencies are selected as a delegation frequency and calibrated to get the compensation values of the delegation frequencies. The compensation value of $2^{nd}$ frequency is applied to $4^{th}$ and $6^{th}$ frequencies, and the compensation value of $8^{th}$ frequency is applied to $7^{th}$ and $9^{th}$ frequencies.

That is, the compensated frequencies are grouped with un-compensated frequencies, and data of compensated delegation frequencies is applied to the other frequencies in the same group as described at step 103.

In other words, frequencies are grouped according to the output power characteristics thereof. Therefore, the number of groups is varied according to a deviation of output power of frequencies. For obtaining one compensation value from groups, one frequency is selected as a delegation frequency. The compensation value is obtained and stored in a read only memory (ROM). Therefore, compensation values as many as the number of groups are stored in the ROM.

However, for an effect power control, a large number of compensation values are required, thereby requiring a large number of groups. This is a cause to increase a capacity of an internal memory of a mobile terminal and a manufacturing time, whereby a throughput is low and a manufacturing cost is high.

On the other hands, if the number of group is reduced, there is a problem in that the output power cannot be elaborately controlled.

SUMMARY OF THE INVENTION

Therefore, it is an object of the present invention to provide a method of compensating an output power of a mobile terminal in which an output power of a mobile terminal can elaborately be compensated with a small number of delegation frequencies.

It is another object of the present invention to provide a method of compensating an output power of a mobile terminal in which can lower a cost and increase a throughput.

In accordance with one aspect of the present invention, there is provided a method for compensating an output power of a mobile terminal, including the steps of: a) selecting delegation frequencies among frequencies currently used in the mobile terminal; b) obtaining compensation values of the delegation frequencies; c) obtaining gradients of the neighboring frequencies close to a current frequency to be compensated; and d) obtaining an optimal compensation value for the current frequency by using the gradients of the neighboring frequencies to thereby compensate the current frequency.

Further, in accordance with another aspect of the present invention, there is provided a method of compensating an output power of a mobile terminal, including the steps of: a) identifying a current frequency to be compensated; b) obtaining upper and lower gradients by using compensation values of upper and lower neighboring frequencies close to the current frequency; c) obtaining upper and lower optimal compensation values for the current frequency by using the upper and lower gradients; and d) selecting one of the upper and lower optimal compensation values to be applied to a compensation of the current frequency.

In accordance with still another aspect of the present invention, there is provided a method of compensating an output power of a mobile terminal, including the steps of: a) selecting several frequencies as delegation frequencies among currently used frequencies; b) obtaining compensation values of the delegation frequencies to compensate the delegation frequencies; and c) obtaining compensation values for respective frequencies other than the delegation frequency to compensate the frequencies other than the delegation frequency, respectively.

BRIEF DESCRIPTION OF THE DRAWINGS

The above and other objects and features of the instant invention will become apparent from the following description of preferred embodiments taken in conjunction with the accompanying drawings, in which:

FIG. 5B is a graph illustrating output power deviation characteristics of a mobile terminal using a conventional output power compensation method.

DETAILED DESCRIPTION OF THE INVENTION

Other objects and aspects of the invention will become apparent from the following description of the embodiments with reference to the accompanying drawings, which is set forth hereinafter.

Figure 1:
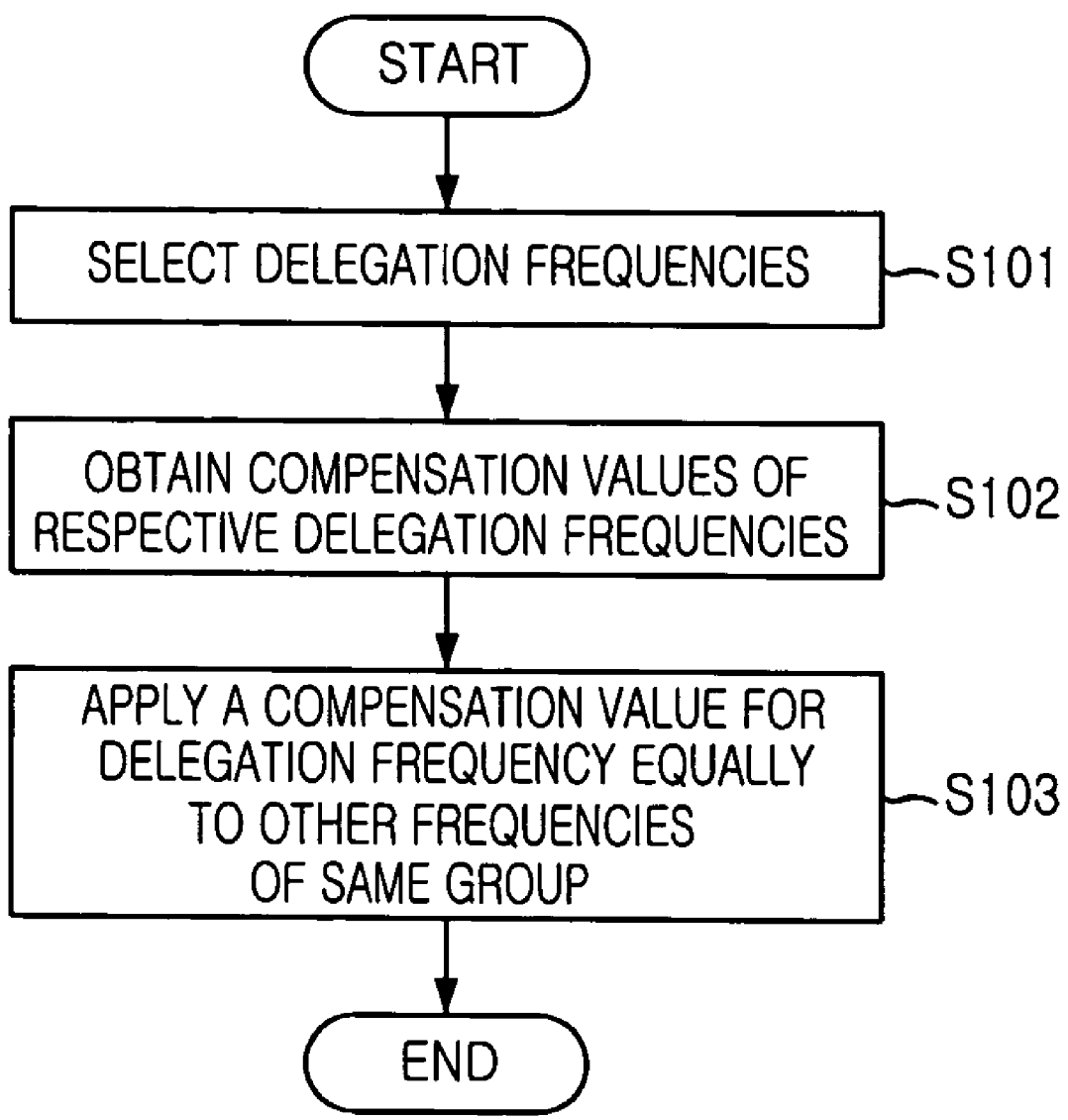
FIG. 1 is a flowchart showing a conventional method for compensating an output power of mobile terminal.
Figure 2:
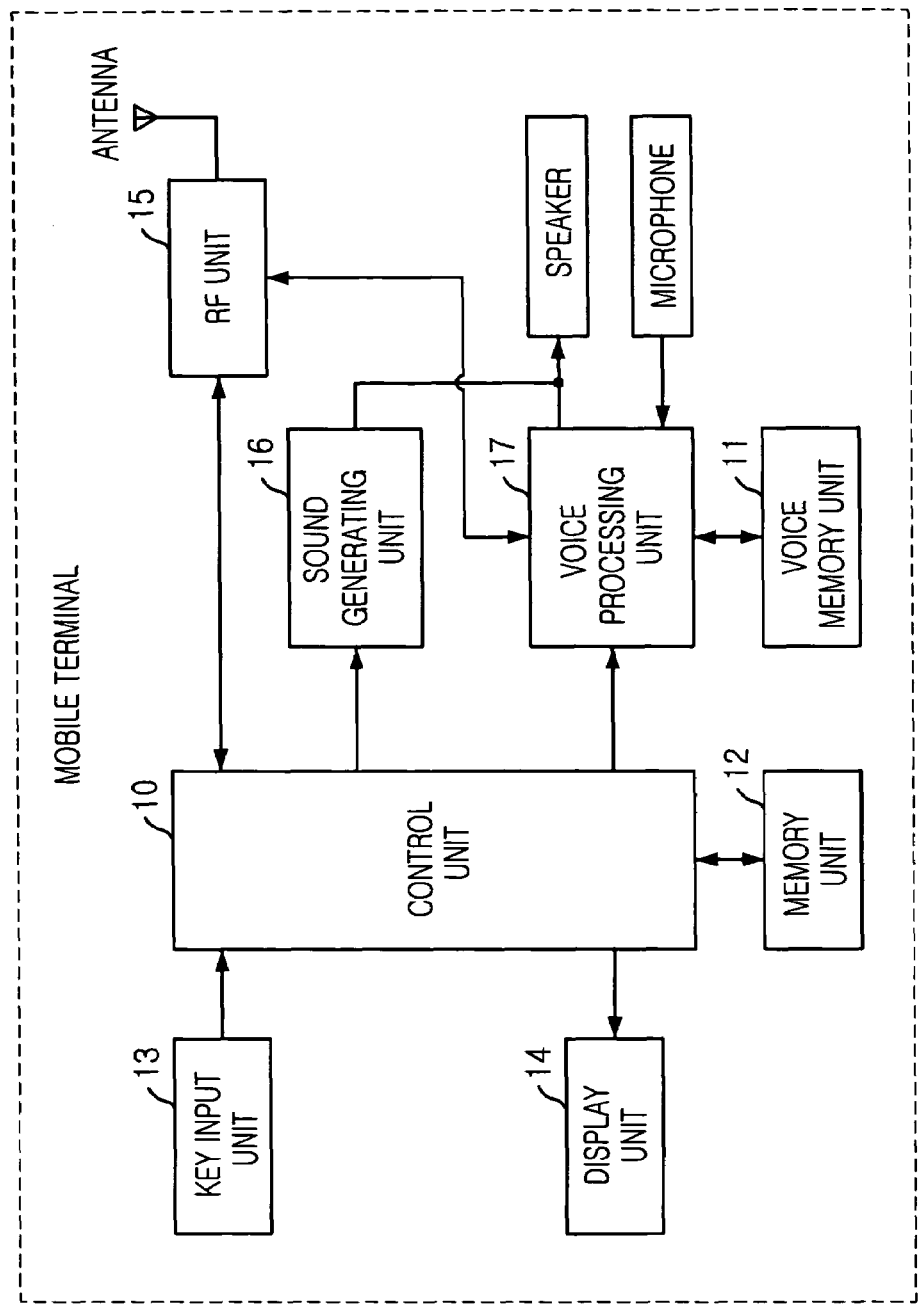
FIG. 2 is a block diagram illustrating a mobile terminal in accordance with a preferred embodiment of the present invention.

FIG. 2 is a block diagram illustrating a mobile terminal in accordance with a preferred embodiment of the present invention.

Referring to FIG. 2, the mobile terminal includes a control unit 10, a voice memory unit 11, a memory unit 12, a key input unit 13, a display unit 14, a RF unit 15, a sound generating unit 16, and a voice processing unit 17.

Figure 3:
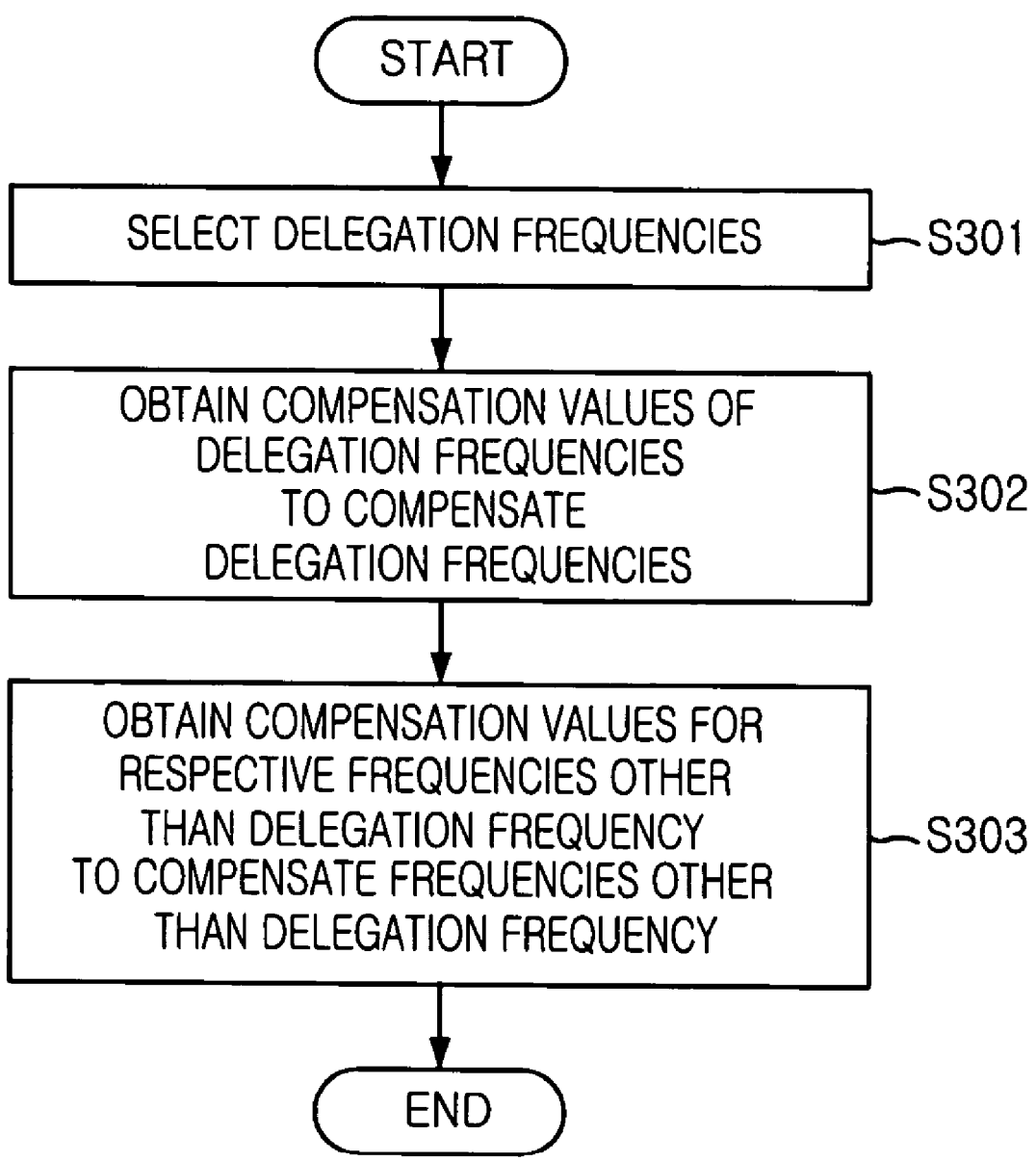
FIG. 3 is a flowchart illustrating a method for compensating output power based on frequencies in a mobile terminal in accordance with a preferred embodiment of the present invention.

FIG. 3 is a flowchart showing a method for compensating an output power of a mobile terminal in accordance with preferred embodiment of the present invention.

First, among currently used frequencies, several frequencies are selected as delegation frequencies at step 301. Then, compensation values of the delegation frequencies are obtained to compensate the delegation frequencies at step 303. Thereafter, compensation values for respective frequencies other than the delegation frequency are obtained to compensate the frequencies other than the delegation frequency, respectively, at step 305.

Figure 4:
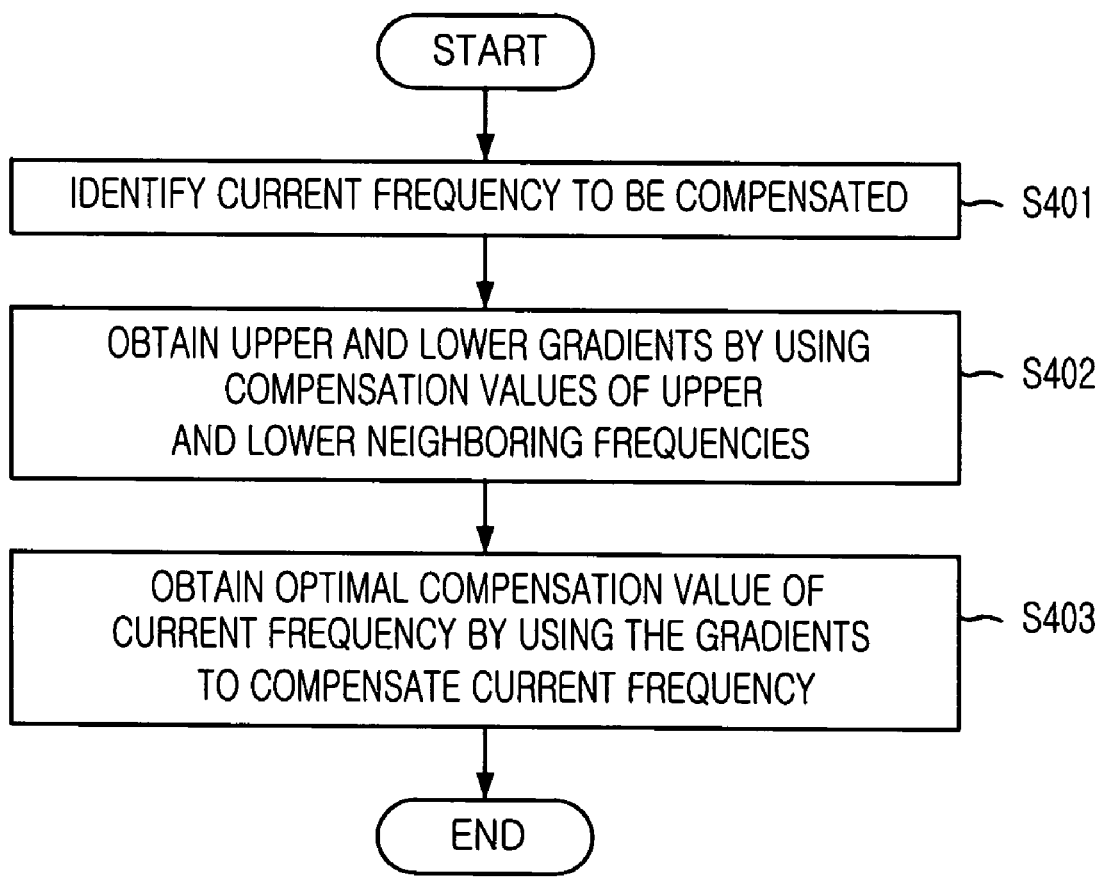
FIG. 4 is a flow chart illustrating a method of compensating respective frequency output power of a mobile terminal according to the present invention.

FIG. 4 is a flowchart illustrating a method of compensating respective frequency output power of a mobile terminal according to the present invention. That is, the flow chart of FIG. 4 explains the step 305 in detail.

First, a current frequency to be compensated (i.e., calibrated) is selected at step 401. Two upper neighboring delegation frequencies and two neighboring delegation frequencies which are close to the current frequency are selected, and upper and lower gradients are obtained by using compensation values of the upper and lower neighboring frequencies at step 402. Thereafter, an optimal compensation value of the current frequency is obtained by using the gradients to compensate the current frequency at step 403.

Figure 5A:
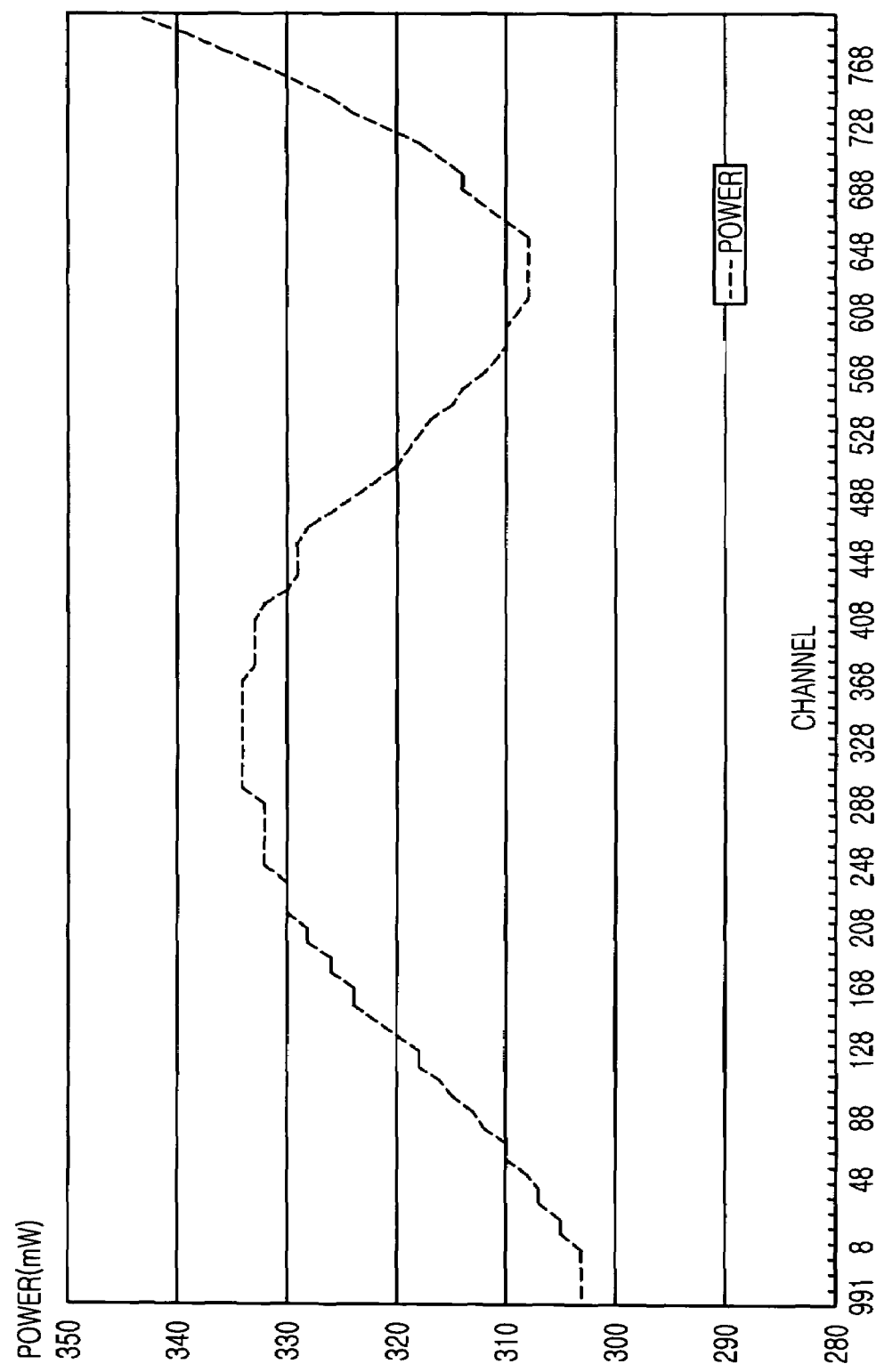
FIG. 5A is a graph showing output power characteristics of a mobile terminal.

Here, the compensation value is a pulse duration modulation (PDM) value which is transmitted to an automatic gain control (AGC) circuit. Also, the gradient is a data which shows output characteristics predicted by the neighboring delegation frequencies. Preferably, two gradients are obtained because a frequency output characteristic shows a non-linear output characteristics as well as linear output characteristics (see FIG. 5A). Also, the delegation frequency represents a frequency which shows a big variation or a different variation in frequency output characteristics.

Hereinafter, a method for obtaining the optimal compensation value for the current frequency is explained in detail.

Here, let us assume that "a" and "b" denote upper neighboring delegation frequencies, and "c" and "d" denote lower neighboring delegation frequencies. The upper and lower neighboring frequencies "b" and "c" are closer to the current frequency than the upper and lower neighboring frequencies "a" and "d". Also, "A" and "B" denote upper compensation values of the upper neighboring delegation frequencies "a" and "b", and "C" and "D" denote lower compensation values of the lower neighboring delegation frequencies "c" and "d".

A difference "B-A" between the two upper compensation values is an upper gradient value, and a difference "D-C" between the two lower compensation values is a lower gradient value.

Upper and lower compensation values for the current frequency can be predicted by the following functions:

$$y=(B-A)(x-b)+B \qquad \text{Eq. 1; and}$$

$$y=(D-C)(x-c)+C \qquad \text{Eq. 2,}$$

where "x" denotes the current frequency value, and "y" denotes compensation value for the current frequency. That is, Eq. 1 is to obtain the upper compensation value for the current frequency, and Eq. 2 is to obtain the lower compensation value for the current frequency. However, for an elaborate frequency compensation, the gradients of the linear functions need to be corrected. That is, gradient correction values are needed.

For the sake of gradient correction values, a compensation value predicted by the lower linear function in the upper neighboring frequency is obtained: B'=(D−C)(b−c)+C; and a compensation value predicted by the upper linear function in the lower neighboring frequency is obtained: C'=(B−A)(c−b)+B.

The gradient correction values are obtained by using the compensation values B, B', C, and C':

$$\Delta B=(B-B')/(c-b); \text{ and}$$

$$\Delta C=(C-C')/(c-b).$$

Such gradient correction values are applied to the upper and lower linear functions described above, whereby upper and lower optimal compensation values for the current frequency are obtained:

$$y=(B-A+\Delta B)(x-b)+B \qquad \text{Eq. 3; and}$$

$$y=(D-C+\Delta A)(x-c)+C \qquad \text{Eq. 4,}$$

Here, it should be determined which linear function is used to obtain the optimal compensation value for the current frequency. If the current frequency is located higher than a convergence point of the upper and lower linear functions Eqs. 3 and 4, the upper linear function Eq. 3 is used, whereas if the current frequency is located lower than a convergence point of the upper and lower linear functions Equations. 3 and 4, the lower linear function Eq. 4 is used.

In the same way described above, the optimal compensation values for all frequencies between the delegation frequencies used in the mobile terminal are obtained.

Figure 5C:
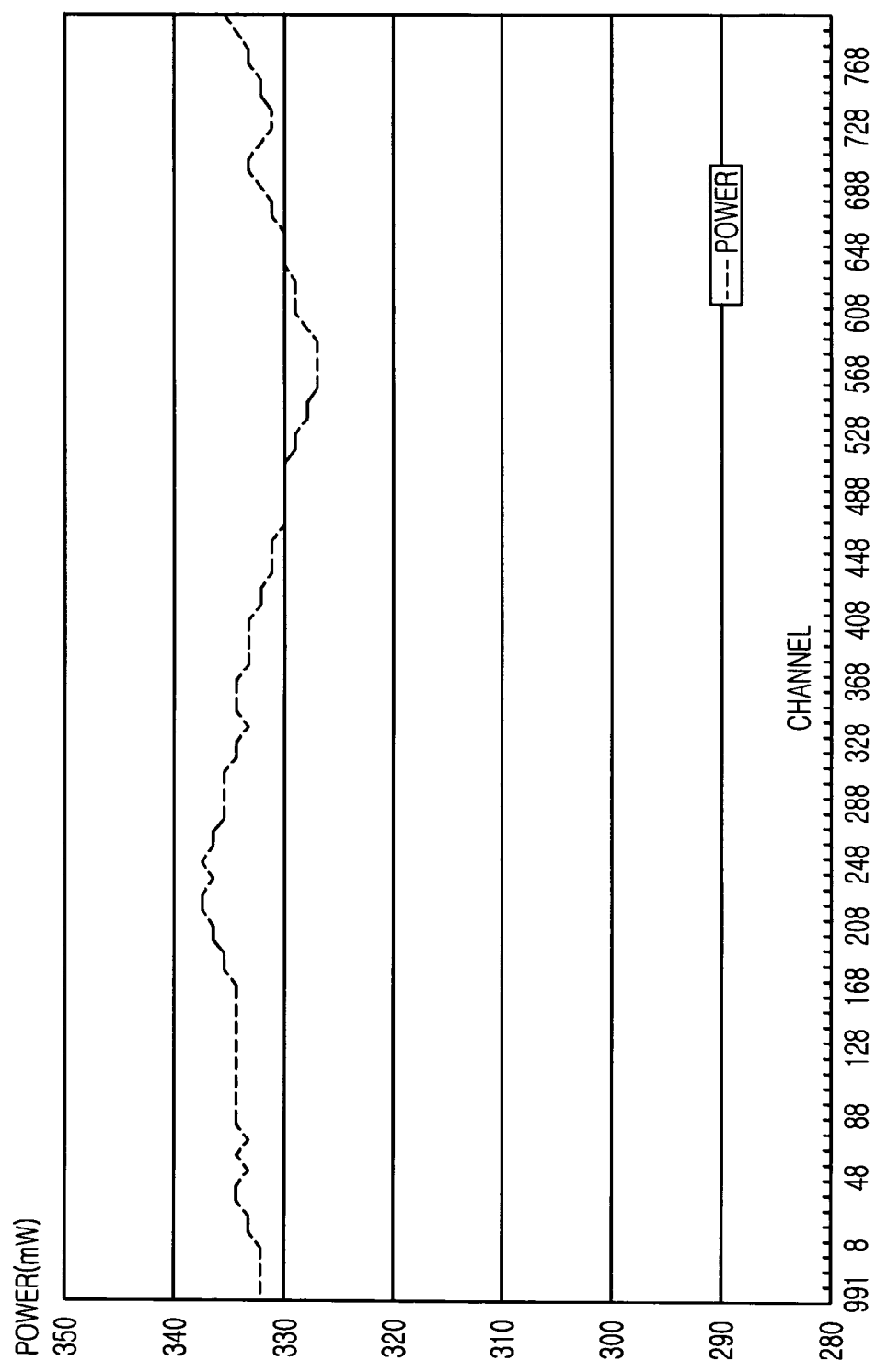
FIG. 5C is a graph showing output power deviation characteristics of the preferred embodiment of the present invention.

FIG. 5B is a graph illustrating output power deviation characteristics of a mobile terminal using a conventional output power compensation method, and FIG. 5C is a graph showing output power deviation characteristics in accordance with the preferred embodiment of the present invention. As can be seen in FIGS. 5B and 5C, output power deviation characteristics of a mobile terminal is significantly improved according to the present invention.

The method of compensating output power of a mobile terminal according to the present invention can be stored in a computer readable medium, e.g., a CD-ROM, a RAM, a ROM, a floppy disk, a hard disk, and an optical/magnetic disk.

As described hereinbefore, since the present invention performs an elaborate calibration (i.e., compensation) for the other frequencies as well as the delegation frequency, an elaborate power control can be achieved compared to a conventional method that a compensation value of the delegation frequencies is equally applied to the other frequencies of the same group. Therefore, since the other frequencies other than the delegation frequency can be elaborately compensated without using an compensation equipment, an output power of a mobile terminal can elaborately be compensated with a small number of delegation frequencies, leading to a low cost and a high throughput.

While the present invention has been shown and described with respect to the particular embodiments, it will be apparent to those skilled in the art that many changes and modifications may be made without departing from the spirit and scope of the invention as defined in the appended claims.

What is claimed is:

1. A method for compensating an output power of a mobile terminal, comprising the steps of:
    a) selecting delegation frequencies among frequencies currently used in the mobile terminal;
    b) obtaining compensation values of the delegation frequencies;
    c) obtaining gradients of the neighboring frequencies close to a current frequency to be compensated, the obtaining gradients further including the steps of:
        c-1) obtaining as an upper gradient a difference between compensation values of at least two upper neighboring delegation frequencies,
        c-2) obtaining as a lower gradient a difference between compensation values of at least two lower neighboring delegation frequencies, and
        c-3) obtaining correction values of the upper and lower gradients; and
    d) obtaining an optimal compensation value for the current frequency by using the gradients of the neighboring frequencies to thereby compensate the current frequency.

2. The method as recited in claim 1, wherein the step d) includes the steps of:
    d-1) obtaining upper and lower optimal compensation values by using the following linear functions:

$y1=(B-A+\Delta B)(x-b)+B$; and $y2=(D-C+\Delta C)(x-c)+C$, where "$\Delta B$" and "$\Delta C$" denote the correction values of the upper and lower gradients, respectively, y1 and y2 denote upper and lower optimal compensation values, respectively, "a" and "b" denote the neighboring delegation frequencies, "c" and "d" denote the neighboring delegation frequencies, "b" and "c'''" are closer to the current frequency than "a" and "d", "A" to "D" denote compensation values of the neighboring delegation frequencies "a" to "d", respectively, and "x" is the current frequency; and
    d-2) selecting one of the upper and lower optimal compensation values according to a location of the current frequency to convergence point of the upper and lower linear functions.

3. A method of compensating an output power of a mobile terminal, comprising the steps of:
    a) identifying a current frequency to be compensated;
    b) obtaining upper and lower gradients by using compensation values of upper and lower neighboring frequencies close to the current frequency, the obtaining upper and lower gradients further including the steps of:
        b-1) obtaining as the upper gradient a difference between compensation values of at least two upper neighboring delegation frequencies,
        b-2) obtaining as the lower gradient a difference between compensation values of at least two lower neighboring delegation frequencies, and
        b-3) obtaining correction values of the upper and lower gradients;
    c) obtaining upper and lower optimal compensation values for the current frequency by using the upper and lower gradients; and
    d) selecting one of the upper and lower optimal compensation values to be applied to a compensation of the current frequency.

4. The method as recited in claim 3, wherein the step d) includes the steps of:
    d-1) obtaining the upper and lower optimal compensation values y1 and y2 by using the following linear functions:

$y1=(B-A+\Delta B)(x-b)+B$; and $y2=(D-C+\Delta C)(x-c)+C$, where "$\Delta B$" and "$\Delta C$" denote the correction values of the upper and lower gradients, respectively, "a" and "b" denote the neighboring delegation frequencies, "c" and "d" denote the neighboring delegation frequencies, "b" and "c'''" are closer to the current frequency than "a" and "d", "A" to "D" denote compensation values of the neighboring delegation frequencies "a" to "d", respectively, and "x" is the current frequency; and
    d-2) selecting one of the upper and lower optimal compensation values according to a location of the current frequency to convergence point of the upper and lower linear functions.

5. A method of compensating an output power of a mobile terminal, comprising the steps of:
    a) selecting several frequencies as delegation frequencies among currently used frequencies;
    b) obtaining compensation values of the delegation frequencies to compensate the delegation frequencies; and
    c) obtaining compensation values for respective frequencies other than the delegation frequency to compensate the frequencies other than the delegation frequency, respectively, wherein the step c) includes the steps of:
- c-1) identifying a current frequency to be compensated;
- c-2) obtaining upper and lower gradients by using compensation values of upper and lower neighboring frequencies close to the current frequency;
- c-3) obtaining upper and lower optimal compensation values for the current frequency by using the upper and lower gradients; and
- c-4) selecting one of the upper and lower optimal compensation values to be applied to a compensation of the current frequency.

6. The method as recited in claim 5, wherein the step c-2) includes the steps of:
- c-2-i) obtaining as the upper gradient a difference between compensation values of at lest two upper neighboring delegation frequencies;
- c-2-ii) obtaining as the lower gradient a difference between compensation values of at lest two lower neighboring delegation frequencies; and
- c-2-iii) obtaining correction values of the upper and lower gradients.

7. The method as recited in claim 6, wherein the step c-3) includes the steps of:
- c-3-i) obtaining the upper and lower optimal compensation values y1 and y2 by using the following linear functions:

$$y1=(B-A+\Delta B)(x-b)+B; \text{ and}$$

$$y2=(D-C+\Delta C)(x-c)+C,$$

where "$\Delta B$" and "$\Delta C$" denote the correction values of the upper and lower gradients, respectively, "a" and "b" denote the neighboring delegation frequencies, "c" and "d" denote the neighboring delegation frequencies, "b" and "c''" are closer to the current frequency than "a" and "d", "A" to "D" denote compensation values of the neighboring delegation frequencies "a" to "d", respectively, and "x" is the current frequency; and
- c-3-ii) selecting one of the upper and lower optimal compensation values according to a location of the current frequency to convergence point of the upper and lower linear functions.

* * * * *